United States Patent
Lin (10) Patent No.: US 12,369,155 B2
(45) Date of Patent: Jul. 22, 2025

(54) METHOD AND APPARATUS FOR SCHEDULING RESTRICTION WITH HIGHER SUBCARRIER SPACING IN MOBILE COMMUNICATIONS

(71) Applicant: MediaTek Inc., Hsinchu (TW)

(72) Inventor: Hsuan-Li Lin, Hsinchu (TW)

(73) Assignee: MediaTek Inc. (TW)

( * ) Notice: Subject to any disclaimer, the term of this patent is extended or adjusted under 35 U.S.C. 154(b) by 329 days.

(21) Appl. No.: 17/944,918

(22) Filed: Sep. 14, 2022

(65) Prior Publication Data

US 2023/0224901 A1     Jul. 13, 2023

Related U.S. Application Data

(60) Provisional application No. 63/297,249, filed on Jan. 7, 2022, provisional application No. 63/297,269, filed on Jan. 7, 2022.

(51) Int. Cl.
*H04W 72/20* (2023.01)

(52) U.S. Cl.
CPC .................................. *H04W 72/20* (2023.01)

(58) Field of Classification Search
None
See application file for complete search history.

(56) References Cited

U.S. PATENT DOCUMENTS

| | | | |
|---|---|---|---|
| 2013/0288698 A1* | 10/2013 | Rune | H04W 56/00 455/452.1 |
| 2021/0385766 A1 | 12/2021 | Manolakos et al. | |
| 2022/0104258 A1* | 3/2022 | Moon | H04L 5/0092 |
| 2024/0056967 A1* | 2/2024 | Liu | H04W 52/028 |

FOREIGN PATENT DOCUMENTS

| WO | WO 2020163368 A1 | 8/2020 |
|---|---|---|
| WO | WO 2021152353 A1 | 8/2021 |

OTHER PUBLICATIONS

Taiwan Intellectual Property Office, Office Action in Taiwan Patent Application No. 112100749, Jan. 5, 2024.
Ericsson: "General RRM requirements for extending NR operation to 71GHz", 3GPP TSG-RAN WG4 #101-e, R4-2118350, Electronic meeting, Nov. 1-12, 2021.
European Patent Office, Extended European Search Report in European Patent Application No. 22216240.6, May 23, 2023.
(Continued)

*Primary Examiner* — Robert M Morlan
(74) *Attorney, Agent, or Firm* — Andy M. Han; Han IP PLLC (57) ABSTRACT

Various solutions for scheduling restriction with higher subcarrier spacing (SCS) with respect to user equipment and network apparatus in mobile communications are described. An apparatus may determine whether a capability is enabled. The apparatus may apply a scheduling restriction on K symbols before synchronization signal block (SSB) symbols and K symbols after the SSB symbols in an event that the capability is enabled. The K symbols are greater than 1 symbol. The apparatus may transmit uplink symbols or receiving downlink symbols outside the symbols with the scheduling restriction.

20 Claims, 9 Drawing Sheets

(56) References Cited

OTHER PUBLICATIONS

"Forward", 3GPP Draft; DRAFT_38133-H10, 3rd Generation Partnership Project (3GPP), Mobile Competence Centre; Sophia-Antipolis Cedex; France, Mar. 29, 2021, XP051991171.
Intel Corporation: "Discussion on initial access aspects for extending NR up to 71 GHz", 3GPP Draft; R1-2107577, 3rd Generation Partnership Project (3GPP), Mobile Competence Centre; Sophia-Antipolis Cedex; France, vol. RAN WG1, No. e-Meeting; Aug. 7, 2021, XP052038486.
Vivo: "Discussion on multi-beam enhancement", 3GPP Draft; R1-2005363, 3rd Generation Partnership Project (3GPP), Mobile Competence Centre; Sophia-Antipolis Cedex; France, vol. RAN WG1, No. e-Meeting; Aug. 8, 2020, XP051917388.

* cited by examiner

METHOD AND APPARATUS FOR SCHEDULING RESTRICTION WITH HIGHER SUBCARRIER SPACING IN MOBILE COMMUNICATIONS

CROSS REFERENCE TO RELATED PATENT APPLICATION(S)

The present disclosure claims the priority benefit of U.S. Provisional Patent Application No. 63/297,249, filed on 7 Jan. 2022, and U.S. Provisional Patent Application No. 63/297,269, filed on 7 Jan. 2022. The contents of aforementioned applications are herein incorporated by reference in their entirety.

TECHNICAL FIELD

The present disclosure is generally related to mobile communications and, more particularly, to scheduling restriction with higher subcarrier spacing (SCS) with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), higher frequency bands are supported for higher data throughput or new applications. For example, the higher frequency bands may comprise a Frequency Range 2 (FR2) which includes frequency bands from 24.25 gigahertz (GHz) to 71.0 GHz. In some higher frequency bands such as 60 GHz to 70 GHz (i.e., Frequency Range 2-2), higher SCS is supported to overcome phase noise. The higher SCS may comprise 120 kilohertz (kHz), 480 kHz or 960 kHz. The higher SCS may be used for both synchronization signal block (SSB) symbols data symbols.

Conventionally, it requires strict synchronization among cells and small coverage to avoid interferences. However, received timing difference among cells could impact on more symbols of higher SCS. There are some reasons that may cause timing difference. For example, timing alignment error (TAE) among different cells/base stations may occur. Since the cell phase synchronization accuracy of 3 microsecond (μs) is defined and unchanged, the TAE among cells could be up to 3 μs which is almost 3 symbols for the higher SCS of 960 kHz. Thus, the received timing difference at the UE could reach several symbols and may cause conflict on data receiving.

Accordingly, how to avoid/reduce interferences occurred in higher frequency bands with higher SCS becomes an important issue for high frequency transmissions in the newly developed wireless communication network. Therefore, there is a need to provide proper schemes to improve data receiving for better performance in high frequency bands.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to scheduling restriction with higher SCS with respect to user equipment and network apparatus in mobile communications.

In one aspect, a method may involve an apparatus determining whether a capability is enabled. The method may also involve the apparatus applying a scheduling restriction on K symbols before SSB symbols and K symbols after the SSB symbols in an event that the capability is enabled. The K symbols are greater than 1 symbol. The method may further involve the apparatus transmitting uplink symbols or receiving downlink symbols outside the symbols with the scheduling restriction.

In one aspect, a method may involve an apparatus transmitting an uplink timing accuracy capability to a network node. The method may also involve the apparatus receiving an indication from the network node to enable a scheduling restriction. The method may further involve the apparatus determining at least one uplink slot according to a slot configuration from the network node. The method may further involve the apparatus applying the scheduling restriction on at least one symbol within the uplink slot in an event that the scheduling restriction is enabled. The method may further involve the apparatus transmitting uplink symbols outside the symbol with the scheduling restriction.

In one aspect, a method may involve a network node enabling a capability to a UE. The method may also involve the network node applying a scheduling restriction on K symbols before SSB symbols and K symbols after the SSB symbols in an event that the capability is enabled. The K symbols are greater than 1 symbol. The method may further involve the network node transmitting downlink symbols or receiving uplink symbols outside the symbols with the scheduling restriction.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

OVERVIEW

Implementations in accordance with the present disclosure relate to various techniques, methods, schemes and/or solutions pertaining to scheduling restriction with higher SCS with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In New Radio (NR), higher frequency bands are supported for higher data throughput and new applications. For example, the higher frequency bands may comprise a Frequency Range 2 (FR2) which includes frequency bands from 24.25 gigahertz (GHz) to 71.0 GHz. In some higher frequency bands such as 60 GHz to 70 GHz (i.e., Frequency Range 2-2), higher SCS is supported to overcome phase noise. The higher SCS may comprise 120 kilohertz (kHz), 480 kHz or 960 kHz. The higher SCS may be used for both synchronization signal block (SSB) symbols data symbols.

Figure 1:
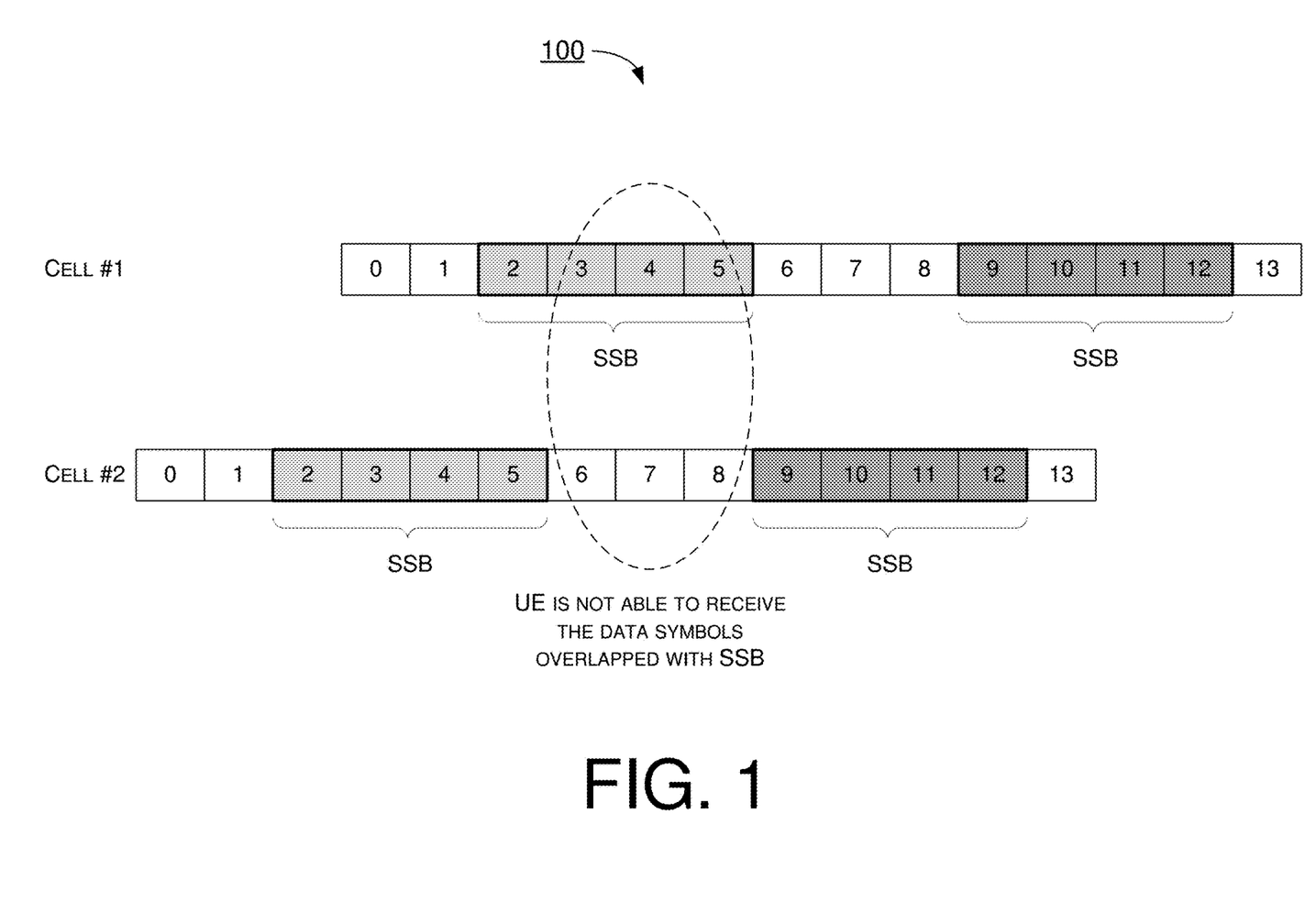
FIG. 1 is a diagram depicting an example scenario under schemes in accordance with implementations of the present disclosure.

Conventionally, it requires strict synchronization among cells and small coverage to avoid interferences. However, received timing difference among cells could impact on more symbols of higher SCS. FIG. 1 illustrates an example scenario 100 under schemes in accordance with implementations of the present disclosure. Scenario 100 involves at least one UE and a plurality of network nodes, which may be a part of a wireless communication network (e.g., an LTE network, a 5G network, an NR network, an IoT network or a 6G network). As shown in FIG. 1, each cell may schedule data symbols (e.g., symbols 6-8) and synchronization signal block (SSB) symbols (e.g., symbols 2-5). Timing difference may occur between a first cell/network node (e.g., Cell #1) and a second cell/network node (e.g., Cell #2). When the slots/symbols from Cell #1 and Cell #2 are not synchronized, a UE is not able to receive the data symbols overlapped with the SSB symbols.

There are some reasons that may cause timing difference. For example, timing alignment error (TAE) among different cells/base stations may occur. Since the cell phase synchronization accuracy of 3 microsecond ($\mu s$) is defined and unchanged, the TAE among cells could be up to 3 $\mu s$ which is almost 3 symbols for the higher SCS of 960 kHz. Thus, the received timing difference at the UE could reach several symbols and may cause conflict on data receiving among cells.

In another example, the UE may apply different receiving (RX) beams for SSB and for data. The UE is not be able to receive the date symbols (e.g., symbols 6-8 of Cell #2) while the UE is required to measure the SSBs of Cell #1. It also needs to consider RX beam switch. The UE will need additional time for RX beam switch. For example, after measuring the SSBs, the UE needs to switch its RX beam for receiving the data symbols. It could take several symbols for UE RX beam switch. Thus, the UE is not able to receive the data symbols right after the SSB symbols.

In another example, propagation delay among cells could also cause timing difference at the UE. Usually, different cells/base stations are not co-located at the same area. The propagation paths of different cells base stations could be different. That may cause different arrival time at the UE which leads to timing difference at the UE.

In view of the above, the present disclosure proposes several schemes pertaining to scheduling restriction with higher SCS with respect to user equipment and network apparatus in mobile communications. According to the schemes of the present disclosure, some scheduling restrictions may be introduced to resolve the aforementioned timing difference issues. The scheduling restriction can also be deemed as uplink (UL) transmission gap or downlink (DL) reception gap. In the UL transmission gap, the UE is not allowed or not expected to transmit UL symbols. In the DL reception gap, the UE is not allowed or not expected to receive DL symbols. The length/duration of the scheduling restriction may be determined according to an SCS. After determining the scheduling restriction, the UE may apply the scheduling restriction on the SSB symbols, the symbols before the SSB symbols, or the symbols after the SSB symbols. Therefore, the UE may have sufficient time for performing measurements (e.g., reference signal/SSB measurement) and switching RX beam. The scheduling conflict among different cells due to timing difference may also be resolved. Accordingly, UE measurement procedures and mobility performance in higher frequency bands/higher SCSs (e.g., FR2-2) may be secured.

Specifically, the UE may be configured to determine whether a capability is enabled. The capability may be enabled by a parameter/indication (e.g., deriveSSB-IndexFromCell) in a higher layer signaling configured by a network node. The parameter/indication deriveSSB-IndexFromCell may indicate whether the UE can utilize serving cell timing to derive the index of SSB transmitted by a neighbor cell. If this field is enabled (e.g., set to true), the UE may assume system frame number (SFN) and frame boundary alignment across cells on the serving frequency within certain tolerance (e.g., 2 orthogonal frequency-division multiplexing (OFDM) symbols). The higher layer signaling may comprise a radio resource control (RRC) signaling.

In some implementations, the UE may determine that the capability is enabled when operating in licensed bands in higher frequency bands (e.g., FR2-2). For example, the UE may assume that the parameter/indication deriveSSB_IndexFromCell is always enabled for the licensed bands in the higher frequency bands (e.g., FR2-2). In some implementations, the UE may determine whether the parameter/indication deriveSSB_IndexFromCell is enabled or not according to the SCS and whether an operating band is operated in a licensed band. For example, the UE may consider deriveSSB_IndexFromCell is enabled for the SCS of 120 kHz in a licensed band.

In an event that the parameter/indication deriveSSB_IndexFromCell is enabled, the UE may determine which symbols can be scheduled (i.e., with scheduling availability) or which symbols cannot be scheduled (i.e., with scheduling restriction). Scheduling availability means that the UE is allowed or expected to transmit UL symbols or receive DL symbols. Scheduling restriction means that the UE is not allowed or not expected to transmit UL symbols or receive DL symbols. Specifically, in an event that the parameter/indication deriveSSB_IndexFromCell is enabled, the UE may be configured to determine K symbols for scheduling restriction. Then, the UE may apply scheduling restriction on at least one of the SSB symbols, the K symbols before the SSB symbols and K symbols after the SSB symbols. After applying the scheduling restriction, the UE may be configured to transmit UL symbols or receive DL symbols outside the symbols with the scheduling restriction.

The UE may determine a number of the K symbols based on the SCS. The SCS may comprise at least one of 480 kHz and 960 kHz. The K symbols may be greater than 1 symbol. For example, K symbols are greater than or equal to 2 symbols for data symbols of 480 kHz SCS and K symbols are greater than or equal to 3 for data symbols of 960 kHz SCS. The UE ignores or skips a scheduling within the symbols with the scheduling restriction.

In an event that the parameter/indication deriveSSB_IndexFromCell is not enabled, the UE may apply the scheduling restriction on all symbols within an SSB-based radio resource management (RRM) measurement timing configuration (SMTC) window. The UE may apply the scheduling availability on the symbols outside the SMTC window. After applying the scheduling restriction, the UE may be configured to transmit UL symbols or receive DL symbols outside the symbols with the scheduling restriction.

In some implementations, the UL symbols may comprise at least one of a physical uplink control channel (PUCCH), a physical uplink shared channel (PUSCH) and a sounding reference signal (SRS). The DL symbols may comprise at least one of a physical downlink control channel (PDCCH), a physical downlink shared channel (PDSCH), tracking reference signal (TRS) and channel state information-reference signal (CSI-RS) for channel quality indicator (Cal).

Thus, if deriveSSB-IndexFromCell is enabled, the UE is not expected to transmit PUCCH/PUSCH/SRS or receive PDCCH/PDSCH/TRS/CSI-RS for CQI on SSB symbols to be measured, and on K data symbol(s) before each consecutive SSB symbols to be measured and K data symbol(s) after each consecutive SSB symbols to be measured within SMTC window duration. The scheduling restriction is applied due to a synchronization signal-reference signal received power (SS-RSRP) or synchronization signal-signal to interference plus noise ratio (SS-SINR) measurement on a frequency range 2 (FR2) intra-frequency cell.

In some implementations, the value of K symbols may be pre-determined or pre-stored in the UE according to the SCS. For example, K=1 for a serving cell with data symbols of 120 kHz SCS. K=4 for a serving cell with data symbols of 480 kHz SCS and SSB symbols of 120 kHz or 480 kHz SCS. K=3 for a serving cell with data symbols of 480 kHz SCS and SSB symbols of 960 kHz SCS. K=7 for a serving cell with data symbols of 960 kHz SCS and SSB symbols of 120 kHz or 480 kHz SCS. K=4 for a serving cell with data symbols of 960 kHz SCS and SSB symbols of 960 kHz SCS.

In some implementations, the value of K symbols may be pre-determined or pre-stored in the UE according to the SCS of a target cell. For example, K=1 for an FR2-1 intra-frequency cell or an FR2-2 intra-frequency cell with data symbols of 120 kHz SCS. K=2 for an FR2-2 intra-frequency cell with data symbols of 480 kHz SCS. K=3 for an FR2-2 intra-frequency cell with data symbols of 960 kHz SCS.

On the other hand, the network side may also apply the same scheduling restrictions as mentioned above. Specifically, a network node (e.g., a gNB or a base station) may be configured to enable a capability to a UE. The network node may enable the capability by a parameter/indication (e.g., deriveSSB-IndexFromCell) via a higher layer signaling (e.g., RRC signaling). The network node may use the parameter/indication deriveSSB-IndexFromCell to indicate the UE whether it can utilize serving cell timing to derive the index of SSB transmitted by a neighbor cell. The network node may be configured to enable the capability when operating in a licensed band in a frequency range 2-2 (FR2-2).

In an event that the parameter/indication deriveSSB_IndexFromCell is enabled, the network node may determine which symbols can be scheduled (i.e., with scheduling availability) or which symbols cannot be scheduled (i.e., with scheduling restriction). Scheduling availability means that the network node is able to schedule UL symbols or DL symbols. Scheduling restriction means that the network node should not schedule UL symbols or DL symbols. After enabling the capability, the network node may be configured to determine K symbols for scheduling restriction. Then, the network node may apply scheduling restriction on at least one of the SSB symbols, the K symbols before the SSB symbols and K symbols after the SSB symbols. The network node may determine a number of the K symbols based on the SCS. The SCS may comprise at least one of 480 kHz and 960 kHz. After applying the scheduling restriction, the network node may be configured to transmit DL symbols or receive UL symbols outside the symbols with the scheduling restriction.

The network node may determine a number of the K symbols based on the SCS. The SCS may comprise at least one of 480 kHz and 960 kHz. The K symbols may be greater than 1 symbol. For example, K symbols are greater than or equal to 2 symbols for data symbols of 480 kHz SCS and K symbols are greater than or equal to 3 for data symbols of 960 kHz SCS. The network node is not expected to schedule DL or UL transmissions within the symbols with the scheduling restriction.

Figure 2:
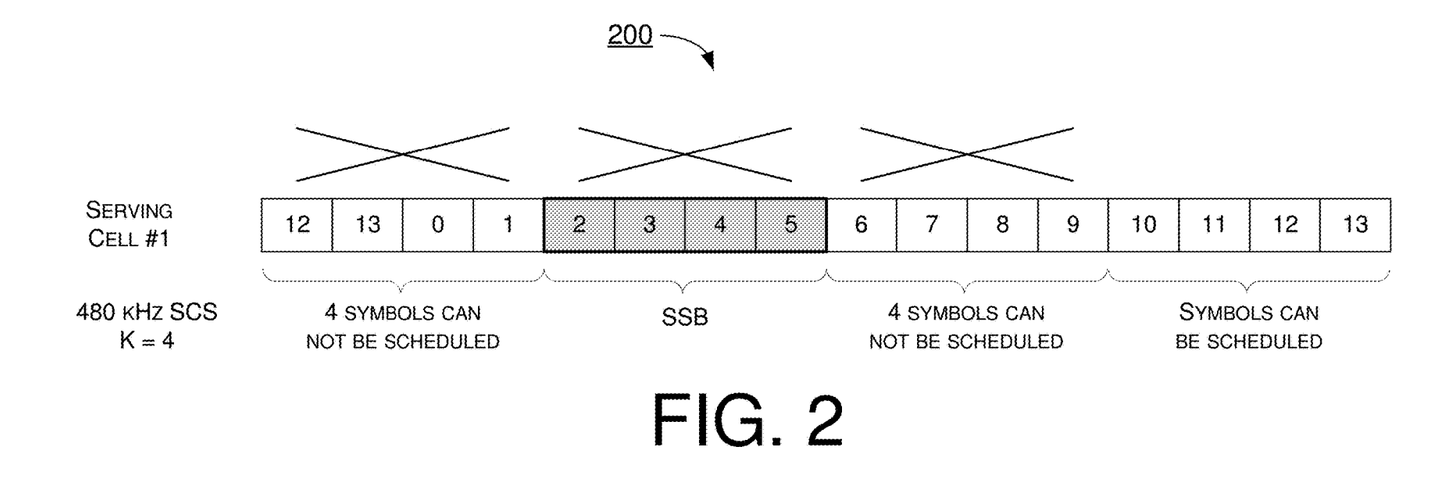
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network node, which may be a part of a wireless communication network (e.g., an LTE network, a 5G network, an NR network, an IoT network or a 6G network). In scenario 200, the network node (e.g., serving cell #1) is operated with 480 kHz SCS for data symbols or SSB symbols. In an event that the parameter deriveSSB-IndexFromCell is enabled, the UE may be configured to determine that K=4 according to the 480 kHz SCS. Then, the UE may apply the scheduling restriction on the SSB symbols (e.g., symbol #2 to symbol #5), 4 symbols before the SSB symbols (e.g., symbol #12 of last slot to symbol #1) and 4 symbols after the SSB symbols (e.g., symbol #6 to symbol #9). The UE is not expected to transmit PUCCH/PUSCH/SRS or receive PDCCH/PDSCH/TRS/CSI-RS for CQI on SSB symbols to be measured, and on 4 data symbols before each consecutive SSB symbols to be measured and 4 data symbols after each consecutive SSB symbols to be measured within SMTC window duration. In an event that symbol #6 is scheduled to the UE, the UE may be configured to ignore the scheduling and skip symbol #6 for data transmission or reception. For the symbols outside the scheduling restriction (e.g., symbol #10 to symbol #13), the UE is able to transmit UL symbols or receive DL symbols.

Figure 3:
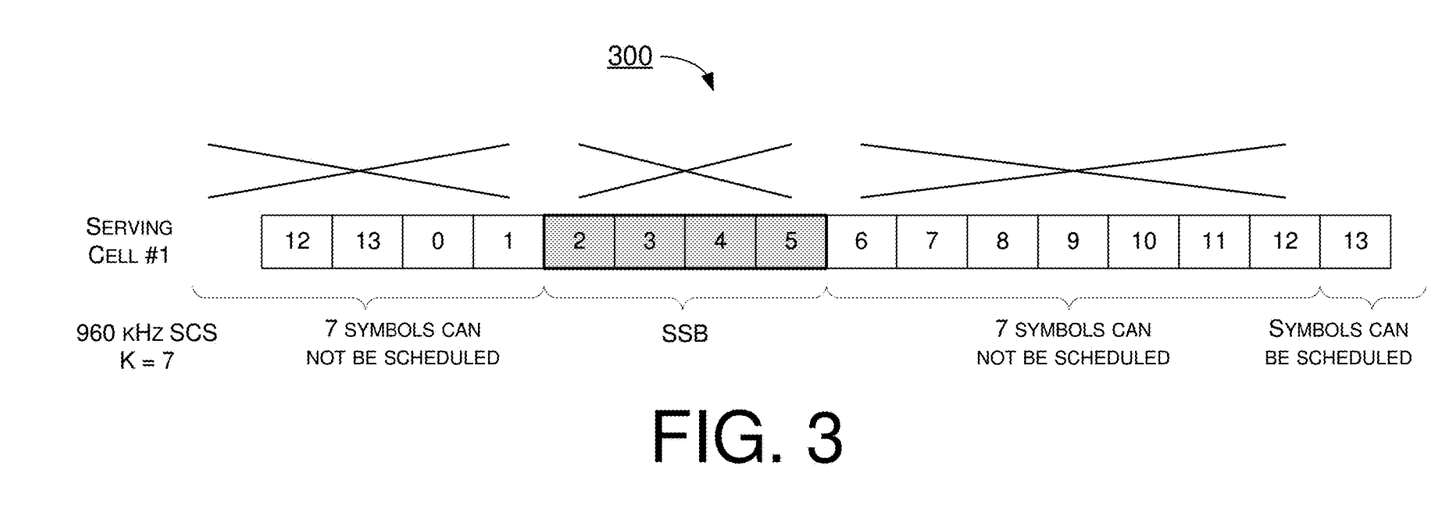
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a network node, which may be a part of a wireless communication network (e.g., an LTE network, a 5G network, an NR network, an IoT network or a 6G network). In scenario 300, the network node (e.g., serving cell #1) is operated with 960 kHz SCS for data symbols or SSB symbols. In an event that the parameter deriveSSB-IndexFromCell is enabled, the UE may be configured to determine that K=7 according to the 960 kHz SCS. Then, the UE may apply the scheduling restriction on the SSB symbols (e.g., symbol #2 to symbol #5), 7 symbols before the SSB symbols (e.g., symbol #9 of last slot to symbol #1) and 4 symbols after the SSB symbols (e.g., symbol #6 to symbol #12). The UE is not expected to transmit PUCCH/PUSCH/SRS or receive PDCCH/PDSCH/TRS/CSI-RS for CQI on SSB symbols to be measured, and on 7 data symbols before each consecutive SSB symbols to be measured and 7 data symbols after each consecutive SSB symbols to be measured within SMTC window duration. In an event that any symbol within the scheduling restriction is scheduled to the UE, the UE may be configured to ignore the scheduling and skip the symbol for data transmission or reception. For the symbols outside the scheduling restriction (e.g., symbol #13), the UE is able to transmit UL symbols or receive DL symbols.

Figure 4:
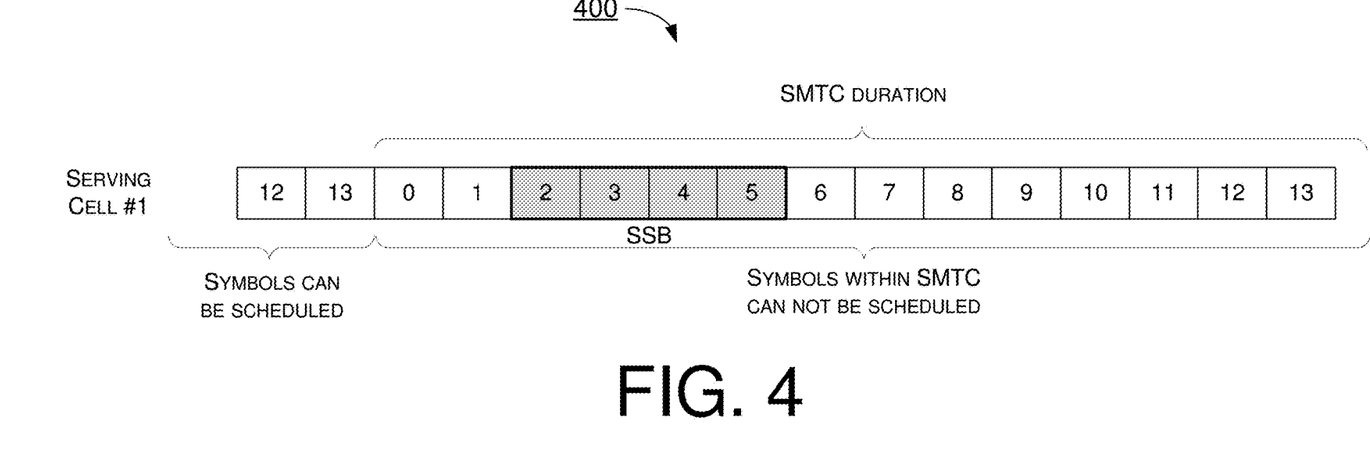
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a UE and a network node, which may be a part of a wireless communication network (e.g., an LTE network, a 5G network, an NR network, an IoT network or a 6G network). In scenario 400, the network node (e.g., serving cell #1) is operated with 960 kHz SCS for data symbols or SSB symbols. In an event that the parameter deriveSSB-IndexFromCell is not enabled, the UE may be configured to apply the scheduling restriction on all symbols within the SMTC window. The UE is not expected to transmit PUCCH/PUSCH/SRS or receive PDCCH/PDSCH/TRS/CSI-RS for CQI within SMTC window duration. In an event that any symbol within the SMTC window is scheduled to the UE, the UE may be configured to ignore the scheduling and skip the symbol for data transmission or reception. For the symbols outside the SMTC window, the UE is able to transmit UL symbols or receive DL symbols.

Figure 5:
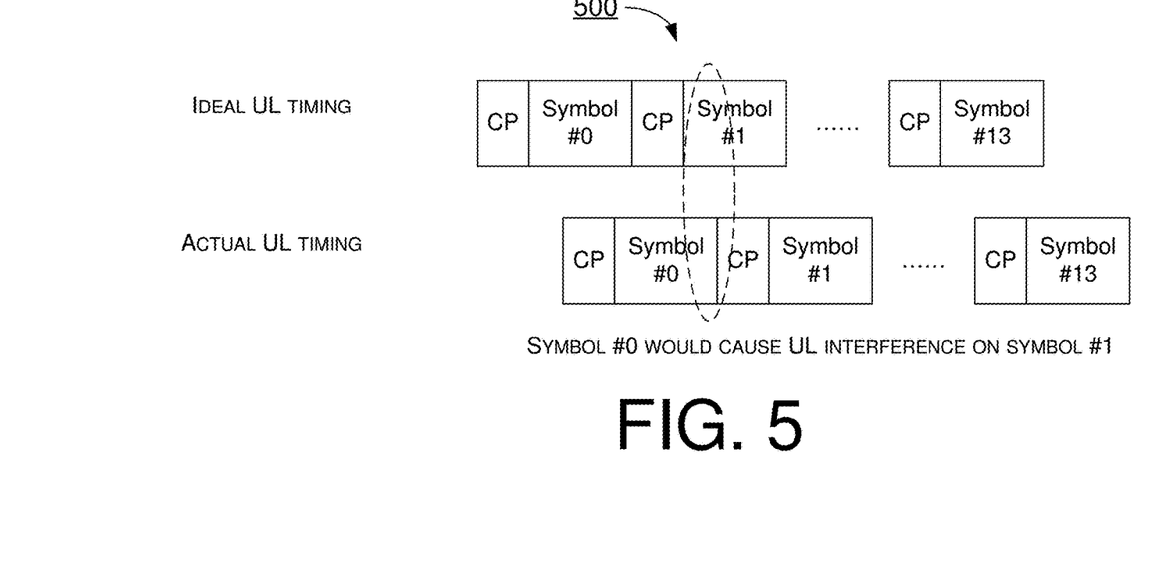
FIG. 5 is a diagram depicting an example scenario under schemes in accordance with implementations of the present disclosure.

In another aspect, when operating in higher frequency bands (e.g., FR2-2) with higher SCS (e.g., 480 kHz or 960 kHz), UE UL transmit timing accuracy would become very challenging. If the UL timing is not accurate enough, it will cause interference at network node UL reception. For example, FIG. 5 illustrates an example scenario 500 under schemes in accordance with implementations of the present disclosure. Scenario 500 involves at least one a plurality of UE and network nodes, which may be a part of a wireless communication network (e.g., an LTE network, a 5G network, an NR network, an IoT network or a 6G network). In ideal scenarios, the UL timing is accurate and the slot/symbol boundaries are aligned or within a tolerable range. However, in actual scenarios, the UL timing may be delayed or interfered. For higher frequency bands with higher SCS, the symbol/slot length would be short. The timing inaccuracy may exceed cyclic prefix (CP) of higher SCS. UL symbols may overlap with each other that leads to interference. For example, symbol #0 would cause UL interference on symbol #1. Therefore, some solutions are needed for resolving the aforementioned timing inaccuracy issues.

In view of the above, the UE needs to communicate with the network to align with the UE's capability on the UL timing accuracy. In event that the UE cannot support accurate timing, at least one of the following methods can be applied. For example, some UL scheduling restrictions may be applied on certain symbols. Alternatively, the UE may be configured to meet relaxed accuracy requirements. Otherwise, UE may only transmit UL symbols on the component carrier configured with SCS of 120 kHz. Accordingly, UL interference for UL transmission with higher SCS may be reduced/avoided.

Specifically, the UE may be configured to transmit an uplink timing accuracy capability to the network node. The uplink timing accuracy capability may indicate a supported set of timing accuracy or an unsupported set of timing accuracy. For example, the uplink timing accuracy capability may indicate a supported SCS or an unsupported SCS. Then, the UE may receive an indication to enable a scheduling restriction from the network node. The UE may determine at least one uplink slot according to a slot configuration from the network node. The UE may apply the scheduling restriction on at least one symbol within the uplink slot in an event that the scheduling restriction is enabled. The UE may transmit uplink symbols outside the symbol with the scheduling restriction. The scheduling restriction may comprise not transmitting the uplink symbols on at least one of a first symbol of the uplink slot and a last symbol of the uplink slot. The uplink slot may be a single slot or a plurality of consecutive slots.

Figure 6:
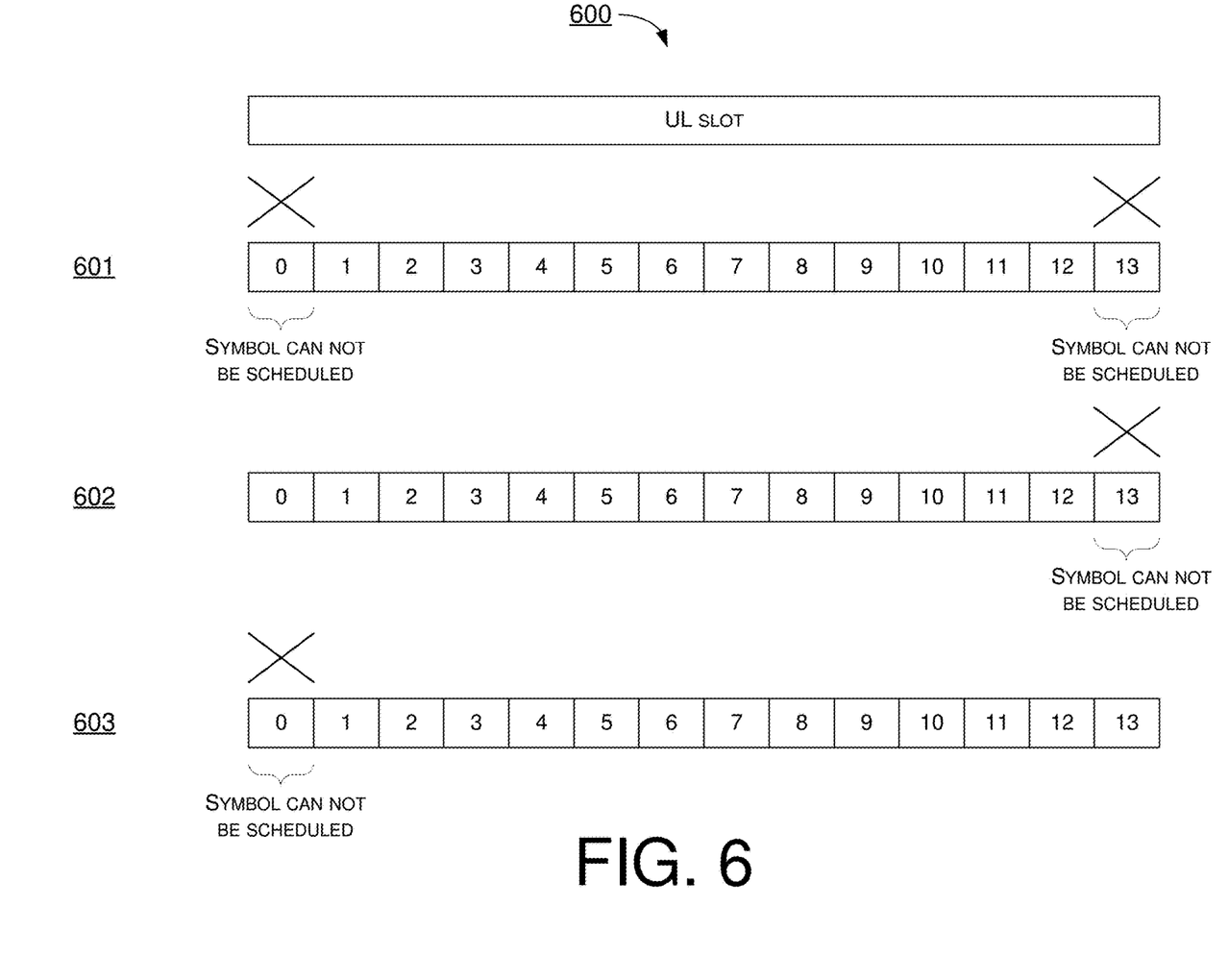
FIG. 6 is a diagram depicting example scenarios under schemes in accordance with implementations of the present disclosure.

FIG. 6 illustrates example scenarios 601, 602 and 603 under schemes in accordance with implementations of the present disclosure. Scenarios 601, 602 and 603 involve a UE and a network node, which may be a part of a wireless communication network (e.g., an LTE network, a 5G network, an NR network, an IoT network or a 6G network). Generally, additional UL scheduling restriction may be applied on certain symbols for higher SCS. For example, the certain UL symbols with UL scheduling restriction may be the first UL symbol or the last UL symbol in the scheduled slot.

In scenario 601, the scheduling restriction is applied on the first UL symbol (e.g., symbol #0) and the last UL symbol (e.g., symbol #13) in the scheduled UL slot. The first symbol and last symbol of a slot may not be scheduled for UL transmission. The UE is not allowed to transmit PUCCH/PUSCH/SRS on symbol #0 and symbol #13. The UE may be configured to transmit PUCCH/PUSCH/SRS on symbol #1 to symbol #12.

In scenario 602, the scheduling restriction is applied on the last UL symbol (e.g., symbol #13) in the scheduled UL slot. The last symbol of a slot may not be scheduled for UL transmission. The UE is not allowed to transmit PUCCH/PUSCH/SRS on symbol #13. The UE may be configured to transmit PUCCH/PUSCH/SRS on symbol #0 to symbol #12.

In scenario 603, the scheduling restriction is applied on the first UL symbol (e.g., symbol #0) in the scheduled UL slot. The first symbol of a slot may not be scheduled for UL transmission. The UE is not allowed to transmit PUCCH/PUSCH/SRS on symbol #0. The UE may be configured to transmit PUCCH/PUSCH/SRS on symbol #1 to symbol #13.

In some implementations, the UE may be configured to signal the network node the UL timing accuracy capability (e.g., SCS) it can support or it cannot support. The network node may be configured to acknowledge whether to apply the UL scheduling restriction. The UE may receive the slot configuration as DDDDU (i.e., the $1^{st}$ to $4^{th}$ slots are DL and the $5^{th}$ slot is UL). The UE may be configured to transmit PUCCH/PUSCH/SRS on the $2^{nd}$ to $13^{th}$ symbols of the $5^{th}$ slot.

Figure 7:
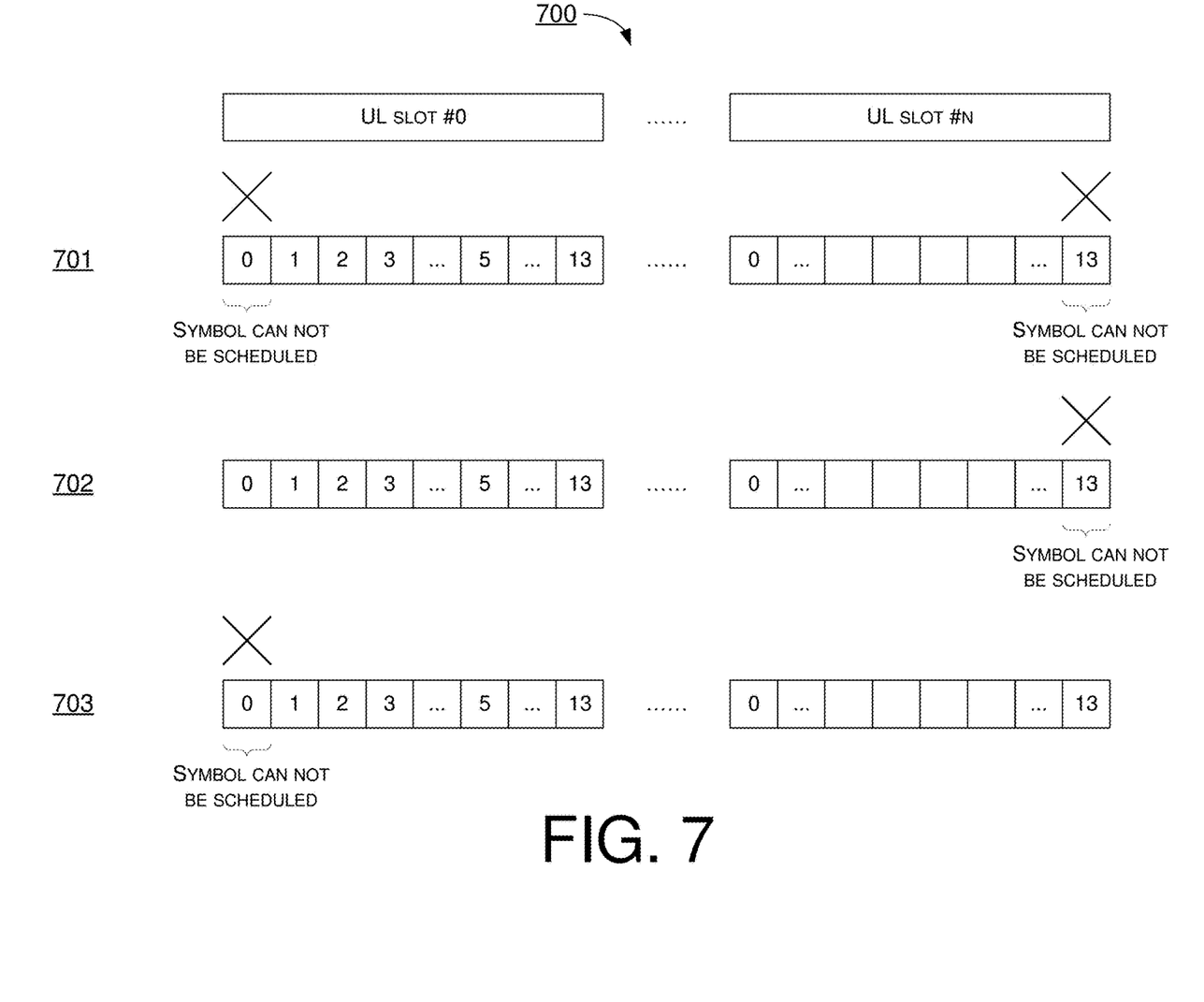
FIG. 7 is a diagram depicting example scenarios under schemes in accordance with implementations of the present disclosure.

FIG. 7 illustrates example scenarios 701, 702 and 703 under schemes in accordance with implementations of the present disclosure. Scenarios 701, 702 and 703 involve a UE and a network node, which may be a part of a wireless communication network (e.g., an LTE network, a 5G network, an NR network, an IoT network or a 6G network). Generally, additional UL scheduling restriction may be applied on certain symbols of consecutive UL slots for higher SCS. For example, the certain UL symbols with UL scheduling restriction may be the first UL symbol of the first uplink slot or the last UL symbol of the last slot for the consecutive scheduled UL slots.

In scenario 701, n+1 slots (e.g., UL slot #0 to UL slot #n) are scheduled as UL slots. The scheduling restriction is applied on the first UL symbol (e.g., symbol #0) of the first slot (e.g., UL slot #0) and the last UL symbol (e.g., symbol #13) of the last slot (e.g., UL slot #n). The first symbol and last symbol of the consecutive slots may not be scheduled for UL transmission. The UE is not allowed to transmit PUCCH/PUSCH/SRS on symbol #0 of slot #0 and symbol #13 of slot #n. The UE may be configured to transmit PUCCH/PUSCH/SRS on symbol #1 to symbol #13 of slot #0, symbol #0 to symbol #13 of slot #1 to slot #n−1 and symbol #0 to symbol #12 of slot #n.

In scenario 702, n+1 slots (e.g., UL slot #0 to UL slot #n) are scheduled as UL slots. The scheduling restriction is applied on the last UL symbol (e.g., symbol #13) of the last slot (e.g., UL slot #n). The last symbol of the consecutive slots may not be scheduled for UL transmission. The UE is not allowed to transmit PUCCH/PUSCH/SRS on symbol #13 of slot #n. The UE may be configured to transmit PUCCH/PUSCH/SRS on symbol #0 to symbol #13 of slot #0 to slot #n−1 and symbol #0 to symbol #12 of slot #n.

In scenario 703, n+1 slots (e.g., UL slot #0 to UL slot #n) are scheduled as UL slots. The scheduling restriction is applied on the first UL symbol (e.g., symbol #0) of the first slot (e.g., UL slot #0). The first symbol of the consecutive slots may not be scheduled for UL transmission. The UE is not allowed to transmit PUCCH/PUSCH/SRS on symbol #0 of slot #0. The UE may be configured to transmit PUCCH/PUSCH/SRS on symbol #1 to symbol #13 of slot #0 and symbol #0 to symbol #13 of slot #1 to slot #n.

In some implementations, the UE may be configured to signal the network node the UL timing accuracy capability (e.g., SCS) it can support or it cannot support. The network node may be configured to acknowledge whether to apply the UL scheduling restriction. The UE may receive the slot configuration as DDDUU (i.e., the $1^{st}$ to $3^{rd}$ slots are DL and the $4^{th}$ to $5^{th}$ slots are UL). The UE may be configured to transmit PUCCH/PUSCH/SRS on the $2^{nd}$ to $14^{th}$ symbols of the $4^{th}$ slot and the $1^{st}$ to $13^{th}$ symbols of the $5^{th}$ slot.

Illustrative Implementations

Figure 8:
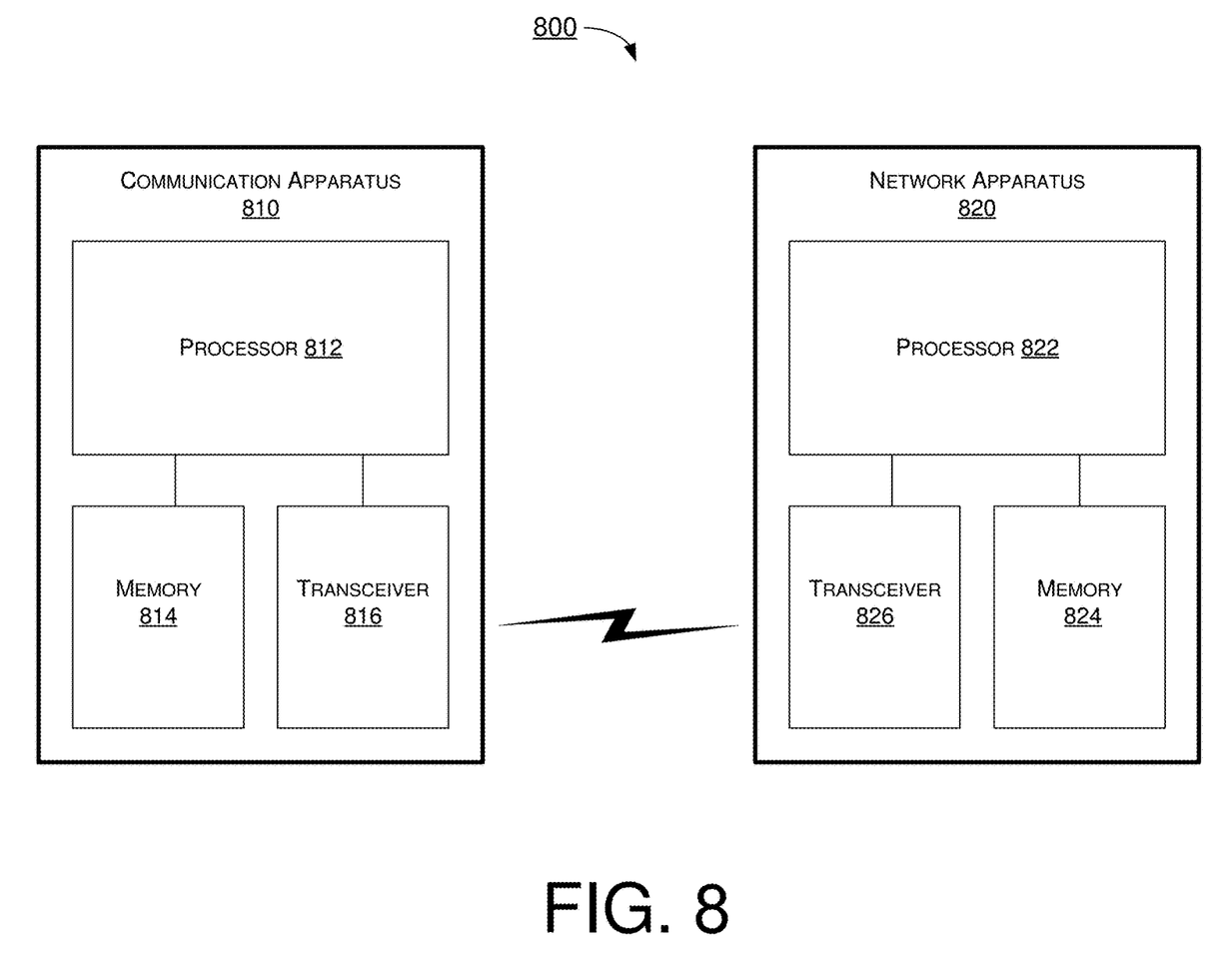
FIG. 8 is a block diagram of an example communication system in accordance with an implementation of the present disclosure.

FIG. 8 illustrates an example communication system 800 having an example communication apparatus 810 and an example network apparatus 820 in accordance with an implementation of the present disclosure. Each of communication apparatus 810 and network apparatus 820 may perform various functions to implement schemes, techniques, processes and methods described herein pertaining to scheduling restriction with SCS with respect to user equipment and network apparatus in mobile communications, including scenarios/schemes described above as well as processes 900, 1000 and 1100 described below.

Communication apparatus 810 may be a part of an electronic apparatus, which may be a UE such as a portable or mobile apparatus, a wearable apparatus, a wireless communication apparatus or a computing apparatus. For instance, communication apparatus 810 may be implemented in a smartphone, a smartwatch, a personal digital assistant, a digital camera, or a computing equipment such as a tablet computer, a laptop computer or a notebook computer. Communication apparatus 810 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 810 may be implemented in a smart thermostat, a smart fridge, a smart door lock, a wireless speaker or a home control center. Alternatively, communication apparatus 810 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 8 such as a processor 812, for example. Communication apparatus 810 may further include one or more other components not pertinent to the proposed scheme of the present disclosure (e.g., internal power supply, display device and/or user interface device), and, thus, such component(s) of communication apparatus 810 are neither shown in FIG. 8 nor described below in the interest of simplicity and brevity.

Network apparatus 820 may be a part of an electronic apparatus, which may be a network node such as a base station, a small cell, a router or a gateway. For instance, network apparatus 820 may be implemented in an eNodeB in an LTE, LTE-Advanced or LTE-Advanced Pro network or in a gNB in a 5G, NR, IoT, NB-IoT or IIoT network. Alternatively, network apparatus 820 may be implemented in the form of one or more IC chips such as, for example and without limitation, one or more single-core processors, one or more multi-core processors, or one or more RISC or CISC processors. Network apparatus 820 may include at least some of those components shown in FIG. 8 such as a processor 822, for example. Network apparatus 820 may further include one or more other components not pertinent to the proposed scheme of the present disclosure (e.g., internal power supply, display device and/or user interface device), and, thus, such component(s) of network apparatus 820 are neither shown in FIG. 8 nor described below in the interest of simplicity and brevity.

In one aspect, each of processor 812 and processor 822 may be implemented in the form of one or more single-core processors, one or more multi-core processors, or one or more CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including autonomous reliability enhancements in a device (e.g., as represented by communication apparatus 810) and a network (e.g., as represented by network apparatus 820) in accordance with various implementations of the present disclosure.

In some implementations, communication apparatus 810 may also include a transceiver 816 coupled to processor 812 and capable of wirelessly transmitting and receiving data. In some implementations, communication apparatus 810 may further include a memory 814 coupled to processor 812 and capable of being accessed by processor 812 and storing data therein. In some implementations, network apparatus 820 may also include a transceiver 826 coupled to processor 822 and capable of wirelessly transmitting and receiving data. In some implementations, network apparatus 820 may further include a memory 824 coupled to processor 822 and capable of being accessed by processor 822 and storing data therein. Accordingly, communication apparatus 810 and network apparatus 820 may wirelessly communicate with each other via transceiver 816 and transceiver 826, respectively. To aid better understanding, the following description of the operations, functionalities and capabilities of each of communication apparatus 810 and network apparatus 820 is provided in the context of a mobile communication environment in which communication apparatus 810 is implemented in or as a communication apparatus or a UE and network apparatus 820 is implemented in or as a network node of a communication network.

In some implementations, processor 812 may be configured to determine whether a capability is enabled. Processor 812 may apply a scheduling restriction on K symbols before the SSB symbols and K symbols after the SSB symbols in an event that the capability is enabled. Processor 812 may transmit, via transceiver 816, uplink symbols or receive, via transceiver 816, downlink symbols outside the symbols with the scheduling restriction.

In some implementations, processor 812 may be configured not to transmit uplink symbols or not to receive downlink symbols on the SSB symbols, the K symbols before the SSB symbols and the K symbols after the SSB symbols. Processor 812 may be configured to apply the scheduling restriction for an SS-RSRP or SS-SINR measurement on a FR2 intra-frequency cell.

In some implementations, processor 812 may be configured to determine a number of the K symbols based on the SCS.

In some implementations, processor 812 may be configured to receive, via transceiver 816, a higher layer signaling from network apparatus 820 for determining whether the parameter deriveSSB-IndexFromCell is enabled.

In some implementations, processor 812 may be configured to determine that the capability is enabled when operating in a licensed band in FR2-2 or determine whether the capability is enabled according to the SCS and the operating band.

In some implementations, processor 812 may be configured to apply the scheduling restriction on all symbols within an SMTC window in an event that the capability is not enabled. Processor 812 may further be configured to ignore or skip a scheduling within the symbols with the scheduling restriction.

In some implementations, processor 812 may be configured to transmit, via transceiver 816, an uplink timing accuracy capability to the network node. Processor 812 may receive, via transceiver 816, an indication to enable a scheduling restriction from the network node. Processor 812 may determine at least one uplink slot according to a slot configuration from the network node. Processor 812 may apply the scheduling restriction on at least one symbol within the uplink slot in an event that the scheduling restriction is enabled. Processor 812 may transmit, via transceiver 816, uplink symbols outside the symbol with the scheduling restriction.

In some implementations, processor 812 may be configured not to transmit the uplink symbols on at least one of a first symbol of the uplink slot and a last symbol of the uplink slot.

In some implementations, processor 822 may be configured to enable a capability to communication apparatus 810. Processor 822 may apply a scheduling restriction on K symbols before the SSB symbols and K symbols after the SSB symbols in an event that the capability is enabled. Processor 822 may transmit, via transceiver 826, downlink symbols or receiving uplink symbols outside the symbols with the scheduling restriction.

In some implementations, processor 822 may be configured not to schedule uplink symbols or not to schedule downlink symbols on the SSB symbols, the K symbols before the SSB symbols and the K symbols after the SSB symbols.

In some implementations, processor 822 may be configured to determine a number of the K symbols based on the SCS.

In some implementations, processor 822 may be configured to configure, via transceiver 826, a parameter deriveSSB-IndexFromCell to communication apparatus 810 via a higher layer signaling. Processor 822 may enable the parameter when operating in a licensed band in a FR2-2.

Illustrative Processes

Figure 9:
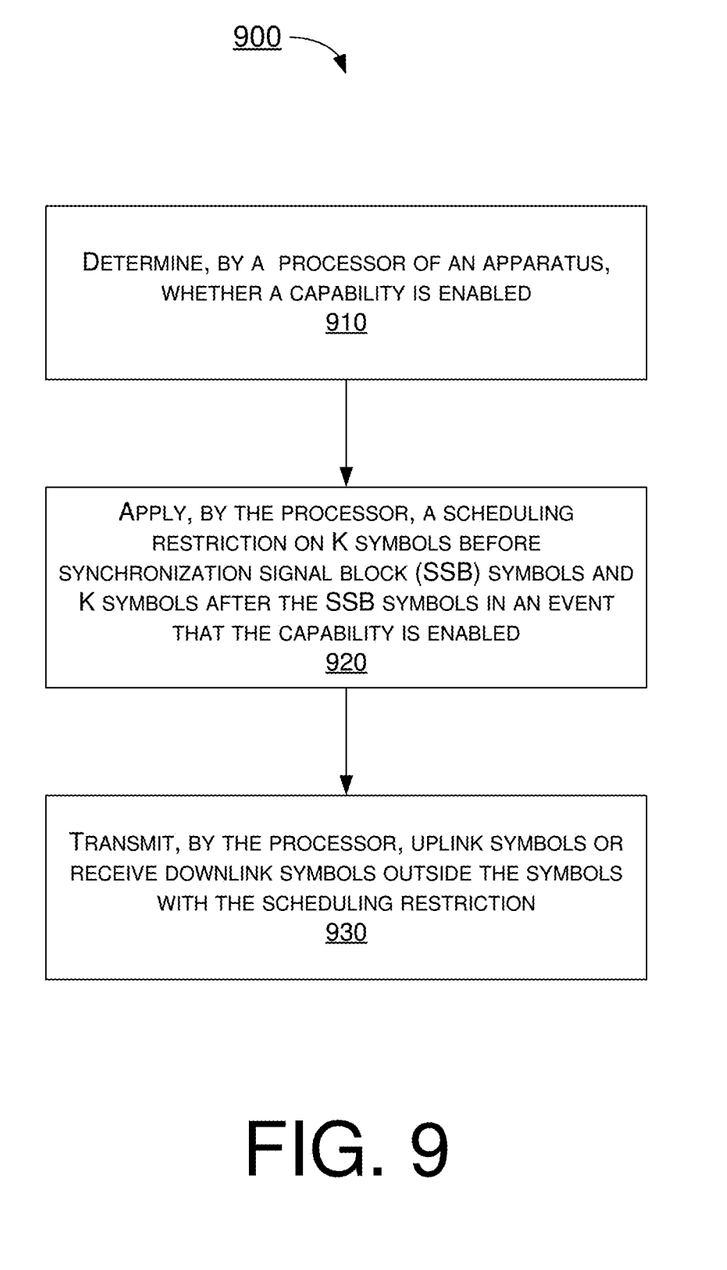
FIG. 9 is a flowchart of an example process in accordance with an implementation of the present disclosure.

FIG. 9 illustrates an example process 900 in accordance with an implementation of the present disclosure. Process 900 may be an example implementation of above scenarios/schemes, whether partially or completely, with respect to scheduling restriction with higher SCS with the present disclosure. Process 900 may represent an aspect of implementation of features of communication apparatus 810.

Process 900 may include one or more operations, actions, or functions as illustrated by one or more of blocks 910, 920 and 930. Although illustrated as discrete blocks, various blocks of process 900 may be divided into additional blocks, combined into fewer blocks, or eliminated, depending on the desired implementation. Moreover, the blocks of process 900 may be executed in the order shown in FIG. 9 or, alternatively, in a different order. Process 900 may be implemented by communication apparatus 810 or any suitable UE or machine type devices. Solely for illustrative purposes and without limitation, process 900 is described below in the context of communication apparatus 810. Process 900 may begin at block 910.

At 910, process 900 may involve processor 812 of communication apparatus 810 determining whether a capability is enabled. Process 900 may proceed from 910 to 920.

At 920, process 900 may involve processor 812 applying a scheduling restriction on K symbols before the SSB symbols and K symbols after the SSB symbols in an event that the capability is enabled. The K symbols are greater than 1 symbol. Process 900 may proceed from 920 to 930.

At 930, process 900 may involve processor 812 transmitting uplink symbols or receiving downlink symbols outside the symbols with the scheduling restriction.

In some implementations, process 900 may further involve processor 812 not transmitting uplink symbols or not receiving downlink symbols on the SSB symbols, the K symbols before the SSB symbols and the K symbols after the SSB symbols.

In some implementations, process 900 may further involve processor 812 determining a number of the K symbols based on the SCS. The SCS comprises at least one of 480 kHz and 960 kHz.

In some implementations, process 900 may further involve processor 812 determining that the capability is enabled when operating in a licensed band in FR2-2.

In some implementations, process 900 may further involve processor 812 determining whether the capability is enabled according to the SCS and an operating band.

In some implementations, process 900 may further involve processor 812 applying the scheduling restriction on all symbols within an SMTC window in an event that the capability is not enabled.

In some implementations, process 900 may further involve processor 812 ignoring a scheduling within the symbols with the scheduling restriction.

Figure 10:
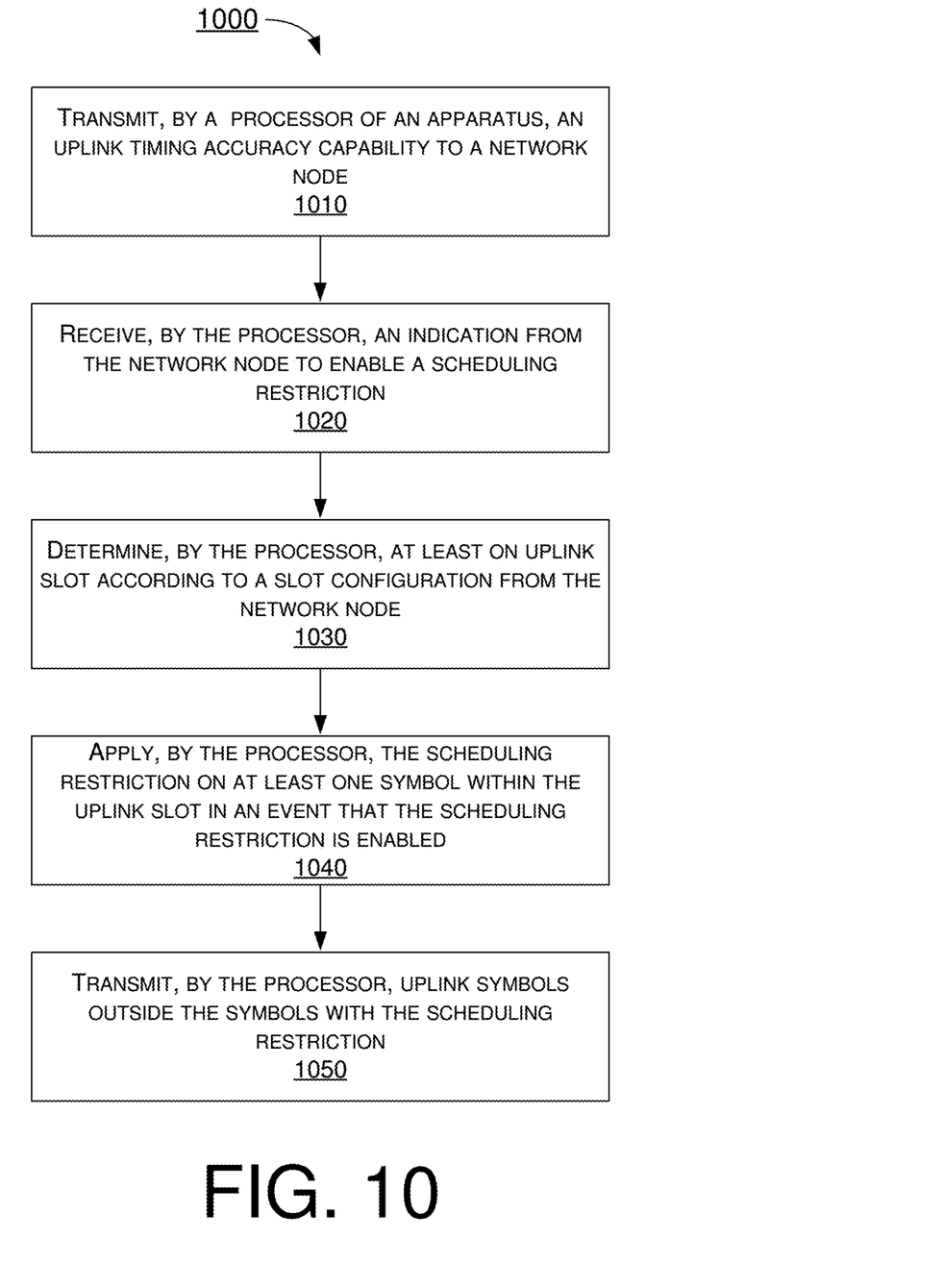
FIG. 10 is a flowchart of an example process in accordance with an implementation of the present disclosure.

FIG. 10 illustrates an example process 1000 in accordance with an implementation of the present disclosure. Process 1000 may be an example implementation of above scenarios/schemes, whether partially or completely, with respect to scheduling restriction with higher SCS with the present disclosure. Process 1000 may represent an aspect of implementation of features of communication apparatus 810. Process 1000 may include one or more operations, actions, or functions as illustrated by one or more of blocks 1010, 1020, 1030, 1040 and 1050. Although illustrated as discrete blocks, various blocks of process 900 may be divided into additional blocks, combined into fewer blocks, or eliminated, depending on the desired implementation. Moreover, the blocks of process 1000 may be executed in the order shown in FIG. 10 or, alternatively, in a different order. Process 1000 may be implemented by communication apparatus 810 or any suitable UE or machine type devices. Solely for illustrative purposes and without limitation, process 1000 is described below in the context of communication apparatus 810. Process 1000 may begin at block 1010.

At 1010, process 1000 may involve processor 812 of communication apparatus 810 transmitting an uplink timing accuracy capability to a network node. Process 1000 may proceed from 1010 to 1020.

At 1020, process 1000 may involve processor 812 receiving an indication from the network node to enable a scheduling restriction. Process 1000 may proceed from 1020 to 1030.

At 1030, process 1000 may involve processor 812 determining at least one uplink slot according to a slot configuration from the network node. Process 1000 may proceed from 1030 to 1040.

At 1040, process 1000 may involve processor 812 applying the scheduling restriction on at least one symbol within the uplink slot in an event that the scheduling restriction is enabled. Process 1000 may proceed from 1040 to 1050.

At 1050, process 1000 may involve processor 812 transmitting uplink symbols outside the symbol with the scheduling restriction.

In some implementations, process 1000 may involve processor 812 not transmitting the uplink symbols on at least one of a first symbol of the uplink slot and a last symbol of the uplink slot.

In some implementations, process 1000 may involve processor 812 indicating a supported set of timing accuracy or an unsupported set of timing accuracy or indicating a supported SCS or an unsupported SCS.

Figure 11:
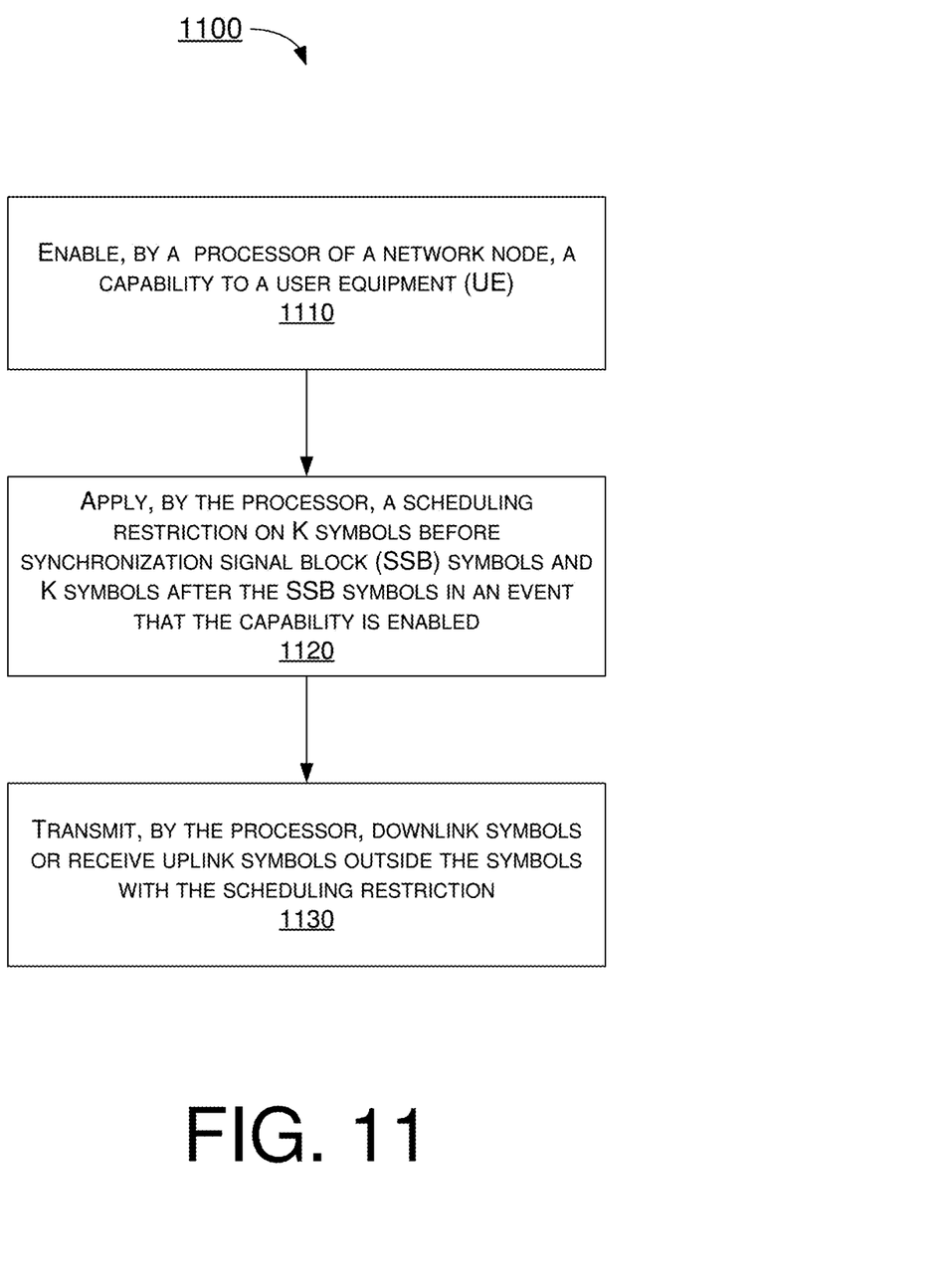
FIG. 11 is a flowchart of an example process in accordance with an implementation of the present disclosure.

FIG. 11 illustrates an example process 1100 in accordance with an implementation of the present disclosure. Process 1100 may be an example implementation of above scenarios/schemes, whether partially or completely, with respect to scheduling restriction with higher SCS with the present disclosure. Process 1100 may represent an aspect of implementation of features of network apparatus 820. Process 1100 may include one or more operations, actions, or functions as illustrated by one or more of blocks 1110, 1120 and 1130. Although illustrated as discrete blocks, various blocks of process 900 may be divided into additional blocks, combined into fewer blocks, or eliminated, depending on the desired implementation. Moreover, the blocks of process 1100 may be executed in the order shown in FIG. 11 or, alternatively, in a different order. Process 1100 may be implemented by network apparatus 820 or any suitable base station or network nodes. Solely for illustrative purposes and without limitation, process 1100 is described below in the context of network apparatus 820. Process 1100 may begin at block 1110.

At 1110, process 1100 may involve processor 822 of network apparatus 820 enabling a capability to a UE. Process 1100 may proceed from 1110 to 1120.

At 1120, process 1100 may involve processor 822 applying a scheduling restriction on K symbols before the SSB symbols and K symbols after the SSB symbols in an event that the capability is enabled. The K symbols are greater than 1 symbol. Process 1100 may proceed from 1120 to 1130.

At 1130, process 1100 may involve processor 822 transmitting, by the processor, downlink symbols or receiving uplink symbols outside the symbols with the scheduling restriction.

In some implementations, process 1100 may further involve processor 822 not scheduling uplink symbols or not scheduling downlink symbols on the SSB symbols, the K symbols before the SSB symbols and the K symbols after the SSB symbols.

In some implementations, process 1100 may further involve processor 822 determining a number of the K symbols based on the SCS. The SCS comprises at least one of 480 kHz and 960 kHz.

In some implementations, process 1100 may further involve processor 822 configuring a parameter deriveSSB-IndexFromCell to the UE via a higher layer signaling.

In some implementations, process 1100 may further involve processor 822 enabling the capability when operating in a licensed band in FR2-2.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
 determining, by a processor of an apparatus, whether a capability is enabled;
 applying, by the processor, a scheduling restriction on K symbols before synchronization signal block (SSB) symbols and K symbols after the SSB symbols in an event that the capability is enabled; and
 transmitting, by the processor, uplink symbols or receiving downlink symbols outside the symbols with the scheduling restriction,
 wherein the K symbols are greater than 1 symbol.

2. The method of claim 1, wherein the applying of the scheduling restriction comprises not transmitting uplink symbols or not receiving downlink symbols on the SSB symbols, the K symbols before the SSB symbols and the K symbols after the SSB symbols.

3. The method of claim 1, wherein the uplink symbols comprise at least one of a physical uplink control channel (PUCCH), a physical uplink shared channel (PUSCH) and a sounding reference signal (SRS), and wherein the downlink symbols comprise at least one of a physical downlink control channel (PDCCH), a physical downlink shared channel (PDSCH), a tracking reference signal (TRS) and a channel state information-reference signal (CSI-RS) for channel quality indicator (Cal).

4. The method of claim 1, wherein the scheduling restriction is applied due to a synchronization signal-reference signal received power (SS-RSRP) or synchronization signal-signal to interference plus noise ratio (SS-SINR) measurement on a frequency range 2 (FR2) intra-frequency cell.

5. The method of claim 1, further comprising:

determining, by the processor, a number of the K symbols based on a subcarrier spacing (SCS),
wherein the SCS comprises at least one of 480 kilohertz (kHz) and 960 kHz.

6. The method of claim 1, wherein the capability is enabled by a parameter deriveSSB-IndexFromCell in a higher layer signaling configured by a network node.

7. The method of claim 1, wherein the determining comprises determining that the capability is enabled when operating in a licensed band in a frequency range 2-2 (FR2-2).

8. The method of claim 1, wherein the determining comprises determining whether the capability is enabled according to a subcarrier spacing (SCS) and an operating band.

9. The method of claim 1, further comprising:
applying, by the processor, the scheduling restriction on all symbols within an SSB-based radio resource management (RRM) measurement timing configuration (SMTC) window in an event that the capability is not enabled.

10. The method of claim 1, further comprising:
ignoring, by the processor, a scheduling within the symbols with the scheduling restriction.

11. A method, comprising:
transmitting, by a processor of an apparatus, an uplink timing accuracy capability to a network node;
receiving, by the processor, an indication from the network node to enable a scheduling restriction;
determining, by the processor, at least one uplink slot according to a slot configuration from the network node;
applying, by the processor, the scheduling restriction on at least one symbol within the uplink slot in an event that the scheduling restriction is enabled; and
transmitting, by the processor, uplink symbols outside the symbol with the scheduling restriction.

12. The method of claim 11, wherein the applying of the scheduling restriction comprises not transmitting the uplink symbols on at least one of a first symbol of the uplink slot and a last symbol of the uplink slot.

13. The method of claim 12, wherein the uplink slot comprises a single slot or a plurality of consecutive slots.

14. The method of claim 11, wherein uplink timing accuracy capability indicates a supported set of timing accuracy or an unsupported set of timing accuracy.

15. The method of claim 11, wherein uplink timing accuracy capability indicates a supported subcarrier spacing (SCS) or an unsupported SCS.

16. A method, comprising:
enabling, by a processor of a network node, a capability to a user equipment (UE);
applying, by the processor, a scheduling restriction on K symbols before synchronization signal block (SSB) symbols and K symbols after the SSB symbols in an event that the capability is enabled; and
transmitting, by the processor, downlink symbols or receiving uplink symbols outside the symbols with the scheduling restriction,
wherein the K symbols are greater than 1 symbol.

17. The method of claim 16, wherein the applying of the scheduling restriction comprises not scheduling uplink symbols or not scheduling downlink symbols on the SSB symbols, the K symbols before the SSB symbols and the K symbols after the SSB symbols.

18. The method of claim 16, further comprising:
determining, by the processor, a number of the K symbols based on a subcarrier spacing (SCS),
wherein the SCS comprises at least one of 480 kilohertz (kHz) and 960 kHz.

19. The method of claim 16, wherein the enabling comprises configuring a parameter deriveSSB-IndexFromCell to the UE via a higher layer signaling.

20. The method of claim 16, wherein the enabling comprises enabling the capability when operating in a licensed band in a frequency range 2-2 (FR2-2).

* * * * *